(12) United States Patent
Breu et al.

(10) Patent No.: US 11,370,311 B2
(45) Date of Patent: Jun. 28, 2022

(54) ELECTRICAL ENERGY SYSTEM WITH FUEL-CELLS

(71) Applicant: Audi AG, Ingolstadt (DE)

(72) Inventors: Martin Breu, Heilsbronn (DE); Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 71 days.

(21) Appl. No.: 16/388,545

(22) Filed: Apr. 18, 2019

(65) Prior Publication Data

US 2019/0322183 A1    Oct. 24, 2019

(30) Foreign Application Priority Data

Apr. 19, 2018   (DE) .................... 10 2018 205 985.3

(51) Int. Cl.
*B60L 50/75*   (2019.01)
*B60L 50/51*   (2019.01)

(52) U.S. Cl.
CPC ............... *B60L 50/75* (2019.02); *B60L 50/51* (2019.02); *B60L 2210/40* (2013.01)

(58) Field of Classification Search
CPC ...................................................... B60L 50/75
USPC ......................................................... 307/9.1
See application file for complete search history.

(56) References Cited

U.S. PATENT DOCUMENTS

| | | | |
|---|---|---|---|
| 6,593,671 B1 | 7/2003 | Schell | |
| 2004/0018399 A1* | 1/2004 | Jung | H01M 8/0488 |
| | | | 429/9 |
| 2004/0024937 A1* | 2/2004 | Duncan | H02M 7/003 |
| | | | 710/100 |
| 2005/0017655 A1* | 1/2005 | Seibt | H05B 41/282 |
| | | | 315/247 |
| 2005/0175876 A1* | 8/2005 | Walter | H01M 8/2457 |
| | | | 429/434 |
| 2006/0166045 A1* | 7/2006 | Ryoichi | H01M 8/04619 |
| | | | 429/9 |
| 2006/0238033 A1 | 10/2006 | Raiser et al. | |
| 2008/0308329 A1* | 12/2008 | Saeki | H01M 8/04753 |
| | | | 180/65.31 |
| 2009/0148735 A1* | 6/2009 | Manabe | H01M 8/04 |
| | | | 429/412 |

(Continued)

FOREIGN PATENT DOCUMENTS

DE   199 32 781 A1   12/1999
DE   101 33 580 A1    1/2003

(Continued)

*Primary Examiner* — Adi Amrany
(74) *Attorney, Agent, or Firm* — Seed IP Law Group LLP

(57) ABSTRACT

An electrical energy system containing fuel-cells and a method for operating an electrical energy system for a motor vehicle are disclosed. The electrical energy system includes, for example: at least one fuel-cell; at least one HV battery; a diode arranged between the at least one fuel-cell and the at least one HV battery, which diode allows current flow only in a direction from the at least one fuel-cell to the at least one HV battery; a switching element configured to reversibly disconnect or close a circuit between the at least one fuel-cell and the at least one HV battery; a control unit configured to control the switching element; and an inductor arranged between the at least one fuel-cell and the at least one HV battery and connected in series with the switching element.

8 Claims, 3 Drawing Sheets

(56) References Cited

U.S. PATENT DOCUMENTS

| | | | |
|---|---|---|---|
| 2011/0127957 A1* | 6/2011 | Chen | B60L 50/15 320/109 |
| 2011/0133677 A1 | 6/2011 | Franke | |
| 2012/0113702 A1 | 5/2012 | Rigbers | |
| 2013/0063072 A1 | 3/2013 | Shirasaka et al. | |
| 2014/0272649 A1* | 9/2014 | Hashim | H01M 8/04731 429/429 |
| 2015/0080978 A1* | 3/2015 | Radzelovage | A61N 1/3981 607/5 |
| 2017/0218911 A1* | 8/2017 | Steinberger | F02P 3/0892 |
| 2017/0345799 A1* | 11/2017 | Rowden | H01L 29/1608 |
| 2018/0233793 A1* | 8/2018 | Oya | H01M 16/006 |
| 2018/0345819 A1* | 12/2018 | Cai | B60L 58/31 |

FOREIGN PATENT DOCUMENTS

| | | | |
|---|---|---|---|
| DE | 10 2004 004 623 A1 | 9/2005 | |
| DE | 10 2004 045 897 A1 | 3/2006 | |
| DE | 11 2006 000 895 T5 | 5/2008 | |
| DE | 10 2008 037 064 A1 | 2/2010 | |
| DE | 10 2009 046 305 A1 | 5/2011 | |
| DE | 10 2010 030 693 A1 | 1/2012 | |
| DE | 10 2011 002 673 A1 | 7/2012 | |
| DE | 10 2012 016 011 A1 | 3/2013 | |
| DE | 10 2012 215 935 A1 | 3/2013 | |
| DE | 10 2015 013 062 A1 | 4/2017 | |
| DE | 102018212532 A1 * | 1/2020 | ........ H01M 8/04089 |
| EP | 2 270 966 A1 | 1/2011 | |
| EP | 3 024 130 A1 | 5/2016 | |

* cited by examiner

ELECTRICAL ENERGY SYSTEM WITH FUEL-CELLS

CROSS-REFERENCE TO RELATED APPLICATION

This application claims priority to Germany Application No. 10 2018 205 985.3, filed Apr. 19, 2018, the entire contents of which are hereby incorporated by reference.

BACKGROUND

Technical Field

The disclosure relates to an electrical energy system containing fuel-cells and to a method for operating an electrical energy system for a motor vehicle.

Description of the Related Art

In a fuel-cell vehicle, it is customary to connect the fuel-cell (FC) as energy supplier to the traction intermediate circuit with the HV battery via a direct current converter (DC/DC converter), to which battery the pulse inverters (PI) with the traction machines (electric motors) are connected. This is necessary because the voltage of the fuel-cell strongly depends upon the current supplied from the fuel-cell. The more current is drawn from the fuel-cell, the smaller the voltage of the fuel-cell is. The DC/DC converter can compensate for this effect and can keep the output voltage of the fuel-cell system (fuel-cell plus DC/DC converter) at a constant level.

Such a system is described, for example, in DE 101 33 580 A1. The fuel-cell serves as auxiliary power source and is activated and connected to the power supply by means of a DC/DC converter when the required power is higher than the available power or when the state of charge (SOC) of the HV battery falls below a critical value.

Suitable DC/DC converters are known, for example, from EP 3 024 130 A1. The DC/DC converter connects the fuel-cell to the HV battery and prevents current return flow from the HV battery into the fuel-cell.

In order to design the system to be more cost-effective and better optimized as to installation space, the DC/DC converter can be replaced with a diode. In this case, the diode shuts when the voltage of the HV battery is higher than the voltage of the fuel-cell less a forward bias voltage drop of the diode. If the battery is loaded, its voltage drops. If the voltage drops below the value of the fuel-cell voltage less a forward bias voltage drop of the diode, the diode becomes conductive, and the fuel-cell supports the traction circuit.

However, the use of a simple diode to connect the fuel-cell to the remaining HV components and the HV battery has the disadvantage that the power distribution between the fuel-cell and the HV battery can no longer be controlled, resulting in restrictions in the operating strategy. For example, it is no longer possible to protect the fuel supply of the fuel-cell when, for example, a short distance is to be traveled, the existing energy content of the battery is sufficient, and a charging possibility for the battery exists at the destination of the trip.

In order to avoid this disadvantage, a switching element can be used in the energy system, which switching element can prevent the flow of energy from the fuel-cell into the traction circuit even under load, and can recouple the systems in situations in which energy transfer from the fuel-cell into the traction circuit is desired.

In the event of the fuel-cell being connected to the battery circuit, compensation currents that are initially very high can occur as a result of differing voltages of the fuel-cell and the HV battery. Not only high amplitudes, but also, in particular, high current gradients (di/dt) can, furthermore, occur. This is, in some circumstances, problematic with regard to the electromagnetic compatibility (EMC) of the energy system and may have a disadvantageous effect on subcomponents of components.

DE 10 2011 002 673 A1 discloses an energy storage system which consists of several partial systems of individual energy stores which are electrically connected to one another, and a method for adding an energy store to an energy storage system, which method prevents critical compensation currents from flowing between the energy stores. For this purpose, the voltages of the energy store to be added and of the energy storage system are matched to one another by means of a DC chopper before the respective energy store is connected to the energy storage system via switching elements.

DE 10 2008 037 064 A1 discloses a circuit arrangement for supplying an electric drive, to which arrangement can be connected at least two electrical power sources, in which at least one of the at least two electrical power sources supplies the electric drive by means of at least one actuator at least temporarily, and in which at least one electrical power source can be disconnected from the electric drive by means of a switch. The switch may be a diode or a power semiconductor, and the actuator may comprise an inverter bridge.

Known from EP 2 270 966 A1 is a DC/DC converter with auxiliary converter for earth current compensation. The DC/DC converter converts an input DC voltage applied between two input lines into a DC output voltage applied between two output lines, wherein the input lines and the output lines are galvanically separated from one another by capacitors connected in all AC forward and backward paths. The auxiliary converter compensates for a current flowing off via all AC forward and backward paths by electrically-conductively connecting a compensation current path, which extends in parallel to all AC forward and backward paths, via two clocked switches alternately to one each of the input lines or alternately to one each of the output lines. On its side opposite the clocked switches, the compensation current path is connected via at least one capacitor to at least one of the output lines or an intermediate potential line carrying an intermediate potential, or to one of the input lines or an intermediate potential line carrying an intermediate potential. An inductor connected in series with the capacitor is provided in the compensation current path.

BRIEF SUMMARY

Embodiments of the present invention provide systems and methods which at least partially eliminate disadvantages described above.

In an energy system according to one embodiment of the invention, an inductor is arranged between the fuel-cell and the HV battery and connected in series with a switching element with which the fuel-cell can be reversibly connected to and disconnected from the battery circuit. This can prevent large compensation currents from flowing between the fuel-cell and the HV battery when connecting the fuel-cell to the battery circuit or disconnecting the fuel-cell from the battery circuit, and avoids high compensation current gradients.

Embodiments of the invention relate to an energy system for a vehicle. The energy system comprises at least one fuel-cell; at least one HV battery; a diode arranged between the at least one fuel-cell and the at least one HV battery, which diode allows current flow only in the direction from the at least one fuel-cell to the at least one HV battery; a switching element configured to reversibly disconnect or close a circuit between the at least one fuel-cell and the at least one HV battery; a control unit configured to control the switching element; and at least one inductor arranged between the at least one fuel-cell and the at least one HV battery and connected in series with the switching element.

In one embodiment of the energy system, the switching element configured to reversibly disconnect or close a circuit between the at least one fuel-cell and the at least one HV battery ("disconnecting and connecting element") is arranged between the at least one fuel-cell and the at least one HV battery. In a further embodiment, the switching element is arranged between the at least one fuel-cell and the diode. In another variant, the switching element is arranged between the diode and the at least one HV battery.

In one embodiment, the switching element is designed as an electromechanical switching element—for example, as a contactor. In another embodiment, the switching element is designed as a semiconductor switch. In particular embodiments, the switching element comprises at least one IGBT or one MOS-FET.

The switching element is controlled by a control unit in order to reversibly disconnect or close a circuit between the at least one fuel-cell and the at least one HV battery. Via the control unit, a vehicle user can connect the at least one fuel-cell to the intermediate circuit or disconnect it therefrom as desired. The advantages of the energy system include that the fuel-cell and the at least one HV battery can be connected or disconnected very quickly using the disconnecting and connecting element without having to briefly influence the supply of media to the at least one fuel-cell or having to shut down or start the fuel-cell in each case.

In one embodiment, the energy system additionally comprises an emergency disconnecting element configured to disconnect the circuit between the at least one fuel-cell and the at least one HV battery when a critical overvoltage, short circuit, or other critical condition occurs in the energy system—for example, due to a defect. The emergency disconnecting element is used in order to prevent the energy flow from the at least one fuel-cell into the intermediate circuit in the case of a fault. If a short circuit is generated in the intermediate circuit, e.g., by a problem with a cable or a component, it is usually provided that the HV battery be disconnected from the intermediate circuit by contactors or fuses. The emergency disconnecting element is provided in order to now also be able to disconnect the at least one fuel-cell from the intermediate circuit. A short-circuit current can thus be prevented from flowing from the at least one fuel-cell into the traction circuit, for example.

In one embodiment, the emergency disconnecting element comprises a fuse or a pyro disconnecting element.

In one embodiment of the energy system, the emergency disconnecting element and the disconnecting and connecting element are combined in a unit that combines the functions of both elements. The unit then comprises, for example, a contactor or another electromechanical switching element and/or a semiconductor switch, which contain, for example, power transistors, such as IGBT's or MOS-FET's.

According to embodiments of the invention, the energy system comprises at least one inductor, which is arranged between the at least one fuel-cell and the at least one HV battery and connected in series with the switching element. The current increase in an inductor follows the following law:

$$i_L = \frac{1}{L} \cdot \int u_L dt$$

That is, the voltage difference results in a linear increase in current. The slope is, however, determined by 1/L. A smooth and system-compatible connection can thus be ensured.

In one embodiment, the inductor is realized as an air coil or by a correspondingly conditioned HV line. For example, a very short line or a planar busbar system may be used. This results in low costs.

In a further embodiment, the inductor is implemented by a choke, e.g., a storage choke. In this case, it may be useful not to magnetically design the choke for the maximum current of the fuel-cell, in order to make the choke more economical and compact. In one embodiment, the choke is designed to achieve its saturation magnetization during a switching operation of the switching element. The choke is designed, for example, in such a way that, starting from a certain current, saturation of the core material takes place, which is deliberately accepted. This offers the further advantage that the energy stored in the choke is limited, which has a positive effect on system compatibility in the case of load sheddings.

The advantages of the energy system according to embodiments of the invention include that the at least one fuel-cell is connected to the intermediate circuit in a system-compatible manner. Other components of the intermediate circuit are not overloaded by high current gradients. There is also no overloading of the diode or of the switching element. The energy system also has an improved electromagnetic compatibility (EMC).

A method is also provided for operating an energy system comprising at least one fuel-cell and at least one HV battery, between which a diode is connected, a switching element configured to reversibly disconnect the circuit between the at least one fuel-cell and the at least one HV battery, and an inductor which is arranged between the at least one fuel-cell and the at least one HV battery and is connected in series with the switching element. The method comprises disconnecting the circuit between the at least one fuel-cell and the at least one HV battery, when current flow from the at least one fuel-cell to the at least one HV battery is not desired, and closing the circuit between the at least one fuel-cell and the at least one HV battery when current flow from the at least one fuel-cell to the at least one HV battery is desired.

Embodiments of the present invention provide additional degrees of freedom for the operating strategy of the energy system, allowing for an increase in efficiency. Since it is possible to control with which resource the vehicle is in each case operated, a cost advantage can be achieved. In addition, the comfort for the vehicle user is increased, since the resource used can be adapted to the existing infrastructure (charging and refueling).

DETAILED DESCRIPTION

Figure 1:
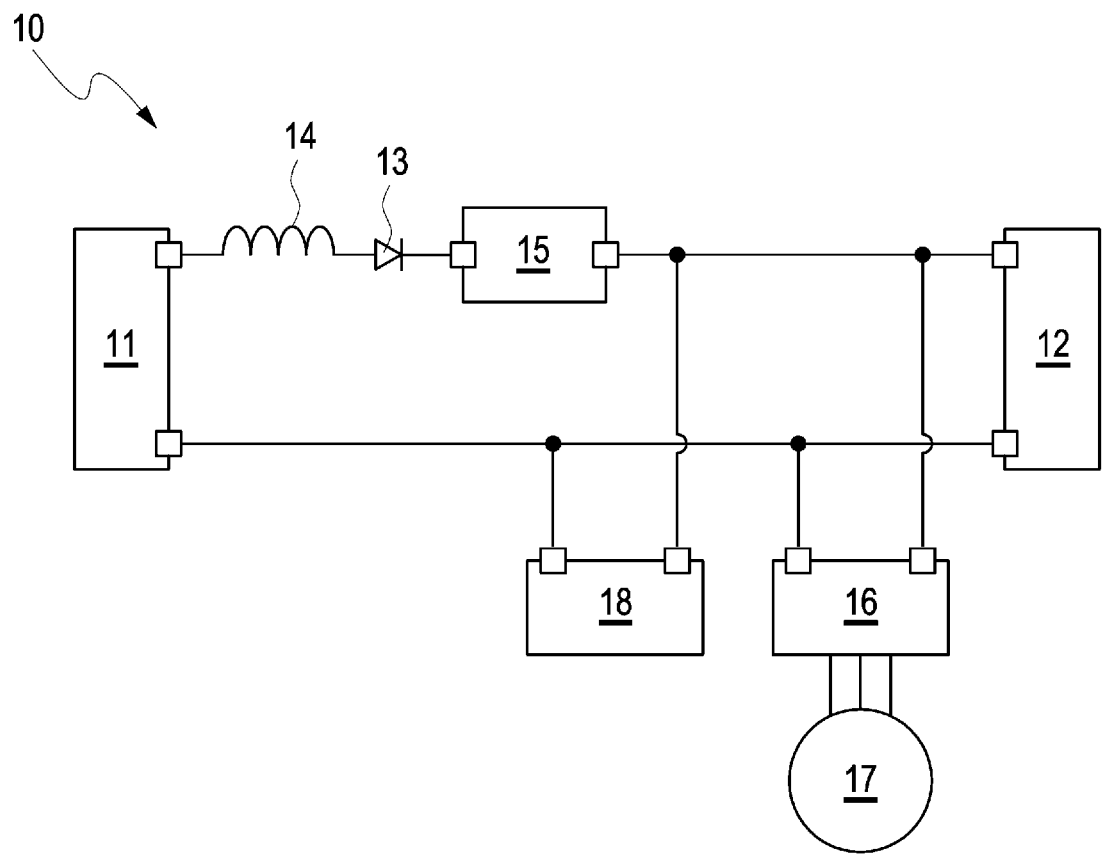
FIG. 1 a schematic illustration of an energy system according to an embodiment of the invention, with connected consumers.

FIG. 1 shows a schematic illustration of an energy system 10 according to an embodiment of the invention, with connected consumers 16, 17, 18. The energy system 10 comprises a fuel-cell 11 and an HV battery 12 as energy sources. These energy sources are connected via a diode 13 which allows current to flow only in the direction from the fuel-cell 11 to the HV battery 12. Arranged between the fuel-cell 11 and the HV battery 12 are a switching element 15 and an inductor 14, which are connected in series. The switching element 15 is controlled via a control device (not shown in the drawing) in order to selectively disconnect or close the circuit between the fuel-cell 11 and the HV battery 12. The inductor 14 is configured to reduce compensation currents and current gradients that occur during a switching operation. In the variant shown in FIG. 1, the inductor 14 is arranged directly on the positive pole of the fuel-cell 11. Connected to the energy system 10 are pulse inverters 16 and electric motors 17, as well as further HV components 18, such as auxiliary units of the fuel-cell, chargers, 12 V DC/DC converters, HV heaters, electric air-conditioning compressors, etc.

Figure 2:
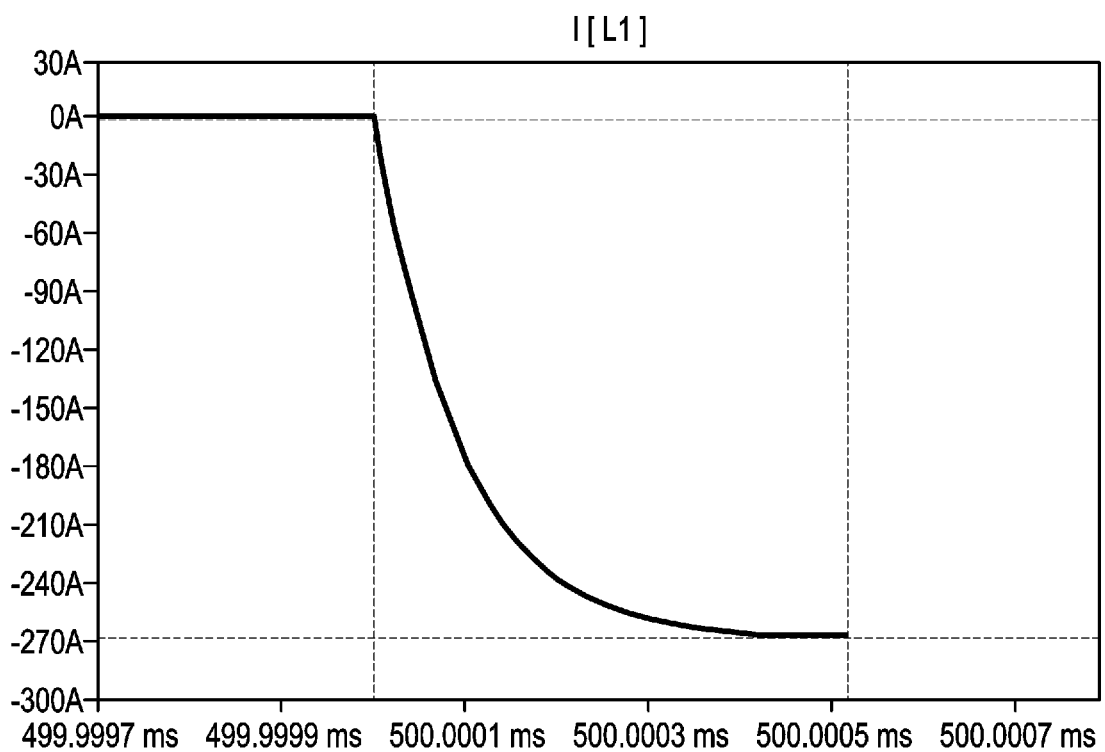
FIG. 2 illustrates a current profile over time in an embodiment of an energy system with a low series inductor when the fuel-cell is connected, and an associated equivalent circuit diagram.
Figure 2:
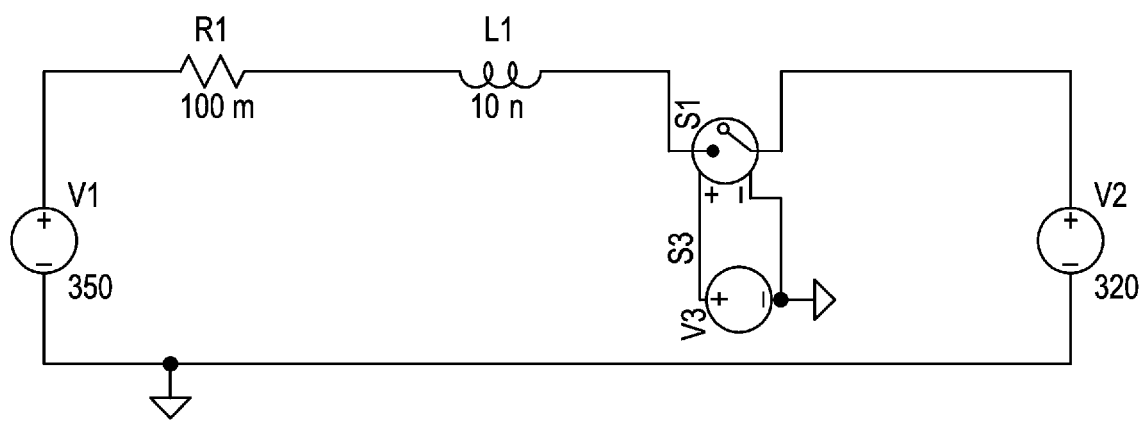

In its upper part, FIG. 2 shows the result of a simulation of the current profile $i_L$ [A] over the time t [ms] in an energy system according to one embodiment of the invention during a connecting operation of the fuel-cell, and, below it, an associated equivalent circuit diagram. In this embodiment, the energy system has a low series inductor of only 10 nF. The inductor can be realized, for example, by a very short line or a planar busbar system. The current reaches its final value within 0.5 µs.

Figure 3:
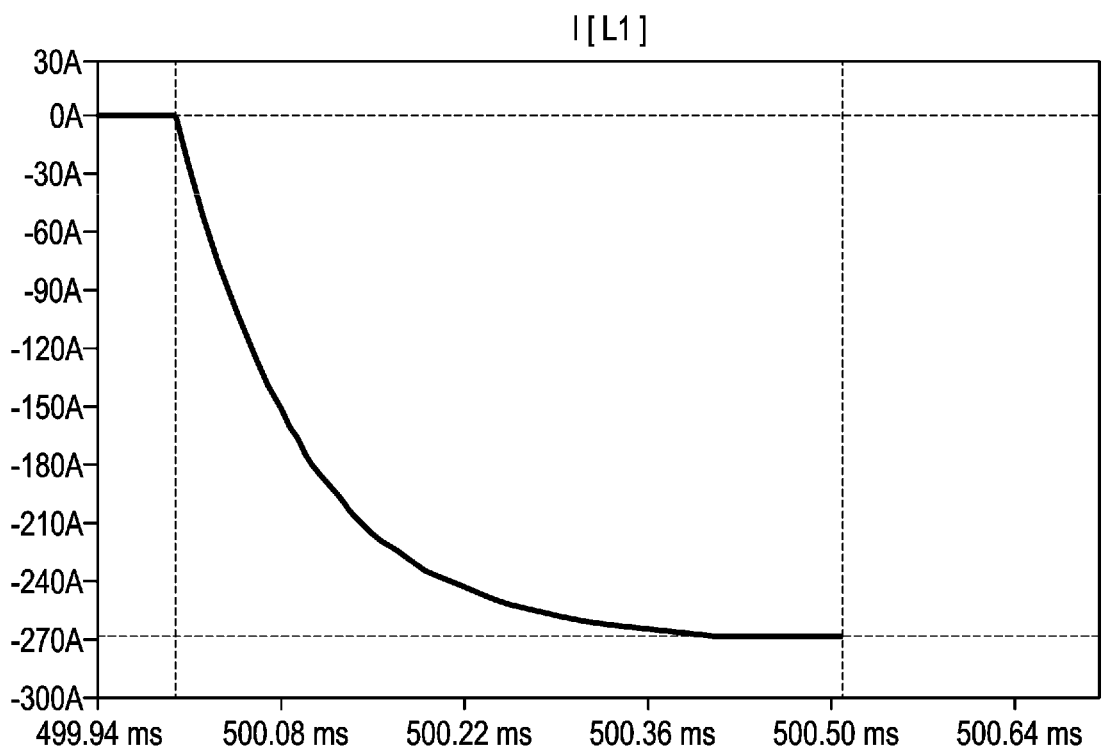
FIG. 3 illustrates a current profile over time in an embodiment of the energy system with an increased series inductor when the fuel-cell is connected, and an associated equivalent circuit diagram.
Figure 3:
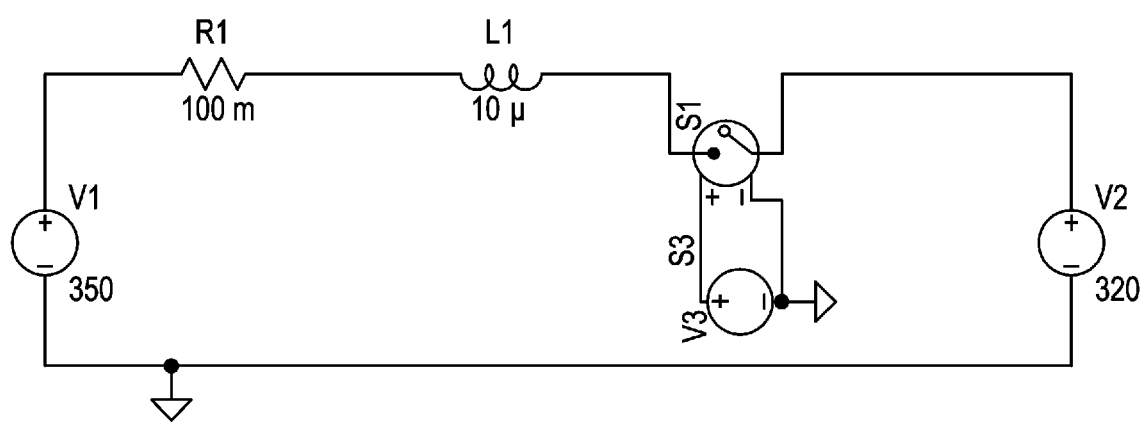

In its upper part, FIG. 3 shows the result of a simulation of the current profile $i_L$ [A] over the time t [ms] in an energy system according to another embodiment of the invention during a connecting operation of the fuel-cell, and, below it, an associated equivalent circuit diagram. In this embodiment, the energy system has an increased series inductor of 10 µF. The inductor can be realized, for example, by an air coil or a storage choke. The current reaches its final value within 0.5 ms; the gradient of the compensation current is thus less by a factor of 1,000 than in the embodiment illustrated in FIG. 2.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An energy system for a vehicle, comprising:
at least one HV battery;
at least one fuel-cell configured to supply a current to the HV battery;
a diode arranged between the at least one fuel-cell and the at least one HV battery;
a switching element arranged between the at least one fuel-cell and the HV battery and configured to disconnect or close a circuit between the at least one fuel-cell and the at least one HV battery;
a control unit configured to control the switching element; and
an inductor arranged between the at least one fuel-cell and the at least one HV battery and connected in series with the switching element, and
wherein there is no DC/DC converter connected between the at least one fuel-cell and the at least one HV battery.

2. The energy system according to claim 1, wherein the switching element is designed as an electromechanical switching element.

3. The energy system according to claim 1, wherein the switching element is designed as a semiconductor switch.

4. The energy system according to claim 3, wherein switching element comprises at least one IGBT or one MOS-FET.

5. The energy system according to claim 1, wherein the inductor is designed to reach a saturation magnetization during a switching operation of the switching element.

6. The energy system of claim 1, further comprising at least one energy consumer selected from a group including a pulse inverter and an electric motor, wherein the at least one energy consumer is coupled between the fuel-cell and the HV battery.

7. A method for operating an energy system with at least one fuel-cell and at least one HV battery, between which a diode is connected, a switching element coupled between the at least one fuel-cell and the HV battery configured to disconnect the circuit between the at least one fuel-cell and the at least one HV battery, and an inductor which is arranged between the at least one fuel-cell and the at least one HV battery and connected in series with the switching element, and wherein there is no DC/DC: convener connected between the at least one fuel-cell and the at least one HV battery, the method comprising:
supplying a current from the at least one fuel-cell to the HV battery;
disconnecting the circuit between the at least one fuel-cell and the at least one HV battery, when current flow from the at least one fuel-cell to the at least one HV battery is not desired; and
closing the circuit between the at least one fuel-cell and the at least one HV battery when current flow from the at least one fuel-cell to the at least one HV battery is desired.

8. The method of claim 7, further comprising supplying energy to at least one energy consumer coupled between the fuel-cell and the HV battery and selected from a group including a pulse inverter and an electric motor.

* * * * *